US009083496B2

(12) United States Patent  
Levin et al.

(10) Patent No.: US 9,083,496 B2
(45) Date of Patent: *Jul. 14, 2015

(54) ADAPTIVE ANTENNA SYSTEM SIGNAL DETECTION

(75) Inventors: Brian D. Levin, Austin, TX (US); Cinda L. Flynn, Pflugerville, TX (US); Jeffrey Keating, Austin, TX (US); Stephen C. Ma, Austin, TX (US)

(73) Assignee: Apple Inc., Cupertino, CA (US)

( * ) Notice: Subject to any disclaimer, the term of this patent is extended or adjusted under 35 U.S.C. 154(b) by 493 days.

This patent is subject to a terminal disclaimer.

(21) Appl. No.: 13/136,489

(22) Filed: Aug. 1, 2011

(65) Prior Publication Data

US 2012/0026906 A1    Feb. 2, 2012

Related U.S. Application Data

(63) Continuation of application No. 11/830,458, filed on Jul. 30, 2007, now Pat. No. 7,990,941.

(51) Int. Cl.
*H04B 7/208*     (2006.01)
*H04L 5/00*     (2006.01)
*H04L 1/00*     (2006.01)
*H04B 17/309*    (2015.01)
*H04B 17/336*    (2015.01)

(52) U.S. Cl.
CPC ............ *H04L 5/0053* (2013.01); *H04B 17/309* (2013.01); *H04L 1/0026* (2013.01); *H04B 17/336* (2013.01)

(58) Field of Classification Search
None
See application file for complete search history.

(56) References Cited

U.S. PATENT DOCUMENTS

| | | | |
|---|---|---|---|
| 7,990,941 B2 * | 8/2011 | Levin et al. .................... | 370/344 |
| 2004/0189519 A1 * | 9/2004 | Kitakado ...................... | 342/371 |
| 2006/0205437 A1 | 9/2006 | Sung et al. | |
| 2007/0123254 A1 | 5/2007 | Choi et al. | |
| 2007/0218910 A1 | 9/2007 | Hill et al. | |
| 2008/0008110 A1 | 1/2008 | Kishigami et al. | |
| 2008/0009322 A1 | 1/2008 | Kim | |
| 2008/0037464 A1 * | 2/2008 | Lim et al. ...................... | 370/329 |
| 2008/0045143 A1 | 2/2008 | Yoshida et al. | |
| 2008/0167075 A1 * | 7/2008 | Kurtz et al. ................... | 455/561 |
| 2008/0220790 A1 * | 9/2008 | Cai et al. ........................ | 455/450 |
| 2009/0016312 A1 * | 1/2009 | Tao et al. ....................... | 370/344 |

OTHER PUBLICATIONS

H Hourani, "An Overview of Adaptive Antenna Systems," S-72.333 Postgraduate Course in Radio Communications (2004/2005), http://www.comlab.hut.fi/opetus/333/2004.sub.--2005.sub.--slides/Adaptive-.sub.--antennas.sub.--text.pdf.

* cited by examiner

*Primary Examiner* — Mohammad Adhami
(74) *Attorney, Agent, or Firm* — Meyertons, Hood, Kivlin, Kowert & Goetzel, P.C.

(57) ABSTRACT

A system and method for processing signals in a communication system is disclosed herein. The system and method comprises processing steps and processing logic for generating a downlink subframe comprising a preamble and a plurality of data bursts within a predetermined frequency band; embedding first and second sets of downlink subframe parameters in the downlink subframe; transmitting the downlink subframe; receiving the downlink subframe; processing data in the preamble to obtain channel quality indicator (CQI) information; and using the CQI information to select either the first set or set second set of downlink subframe parameters to process the data bursts in the downlink subframe.

17 Claims, 5 Drawing Sheets

ADAPTIVE ANTENNA SYSTEM SIGNAL DETECTION

PRIORITY

This application is a continuation of and claims priority to co-owned co-pending U.S. patent application Ser. No. 11/830,458 of the same title filed Jul. 30, 2007, the foregoing incorporated herein by reference in its entirety.

BACKGROUND OF THE INVENTION

1. Field of the Invention

The present invention is directed in general to the field of information processing. In one aspect, the present invention relates to a system and method for improving efficiency in communication networks employing adaptive antenna systems.

2. Description of the Related Art

Wireless communication systems transmit and receive signals within a designated electromagnetic frequency spectrum, but the capacity of the electromagnetic frequency spectrum is limited. As the demand for wireless communication systems continues to expand, there are increasing challenges to improve spectrum usage efficiency. To address this problem, many communication networks have been designed to support adaptive antenna systems (AAS) to improve the communication capacity of the network. Adaptive antenna systems comprise multiple antennas at the transmitting and/or the receiving side of the communication link. In communication networks supporting AAS, the signals are processed adaptively to exploit the spatial dimension of the communication channel.

Figure 1:
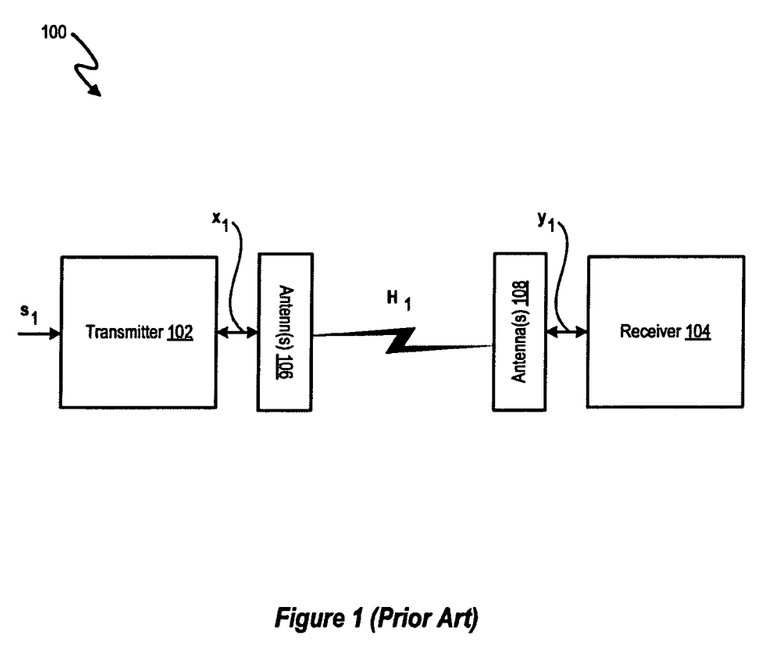
FIG. 1 (labeled prior art) depicts a wireless communication system.

FIG. 1 depicts a wireless communication system 100 in which a transmitter 102 having a single antenna or an array of antennas 106 communicates with receiver 104 having a single antenna or an array of antennas 108. The communication system 100 may be any type of wireless communication system including, but not limited to, a Multiple Input, Multiple Output (MEMO) system, a Space Division Multiple Access (SDMA) system, a Code Division Multiple Access (CDMA) system, an Orthogonal Frequency Division Multiplexing (OFDM) system, or an Orthogonal Frequency Division Multiple Access (OFDMA) system. In the communication system 100, the transmitter 102 may act as a base station, while the receiver 104 acts as a subscriber station, which can be virtually any type of wireless one-way or two-way communication device such as a cellular telephone, wireless equipped computer system, and wireless personal digital assistant. The receiver/subscriber station 104 can also transmits signals which are received by the transmitter/base station 102. The signals communicated between transmitter 102 and receiver 104 can include voice, data, electronic mail, video, and other data, voice, and video signals. In operation, the transmitter 102 transmits a signal data stream (e.g., signal $s_1$) through one or more antennas 106 and over a channel $H_1$ to a receiver 104, which combines the received signal from one or more receive antennas 108 to reconstruct the transmitted data. To transmit the signal vector $s_1$, the transmitter 102 prepares a transmission signal, represented by the vector $x_1$, for the signal $s_1$. (Note: lower case bold variables indicate vectors and upper case BOLD variables indicate matrices). The transmission signal vector $x_1$ is transmitted via a channel represented by a channel matrix $H_1$, and is received at the receiver 104 as a receive signal vector $y_1 = H_1 x_1 + n_1$ (where n represents co-channel interference or noise). The channel matrix $H_1$ represents a channel gain between the transmitter antenna array 106 and the subscriber station antenna array 108. Thus, the channel matrix $H_1$ can be represented by a k×N matrix of complex coefficients, where N is the number of antennas in the transmitter/base station antenna array 106 and k is the number of antennas in the receiver/subscriber station antenna array 108. The value of k can be unique for each receiver/subscriber station. As will be appreciated, the channel matrix $H_1$ can instead be represented by a N×k matrix of complex coefficients, in which case the matrix manipulation algorithms are adjusted accordingly so that, for example, the right singular vector calculation on a k×N channel matrix becomes a left singular vector calculation on a N×k channel matrix. The coefficients of the channel matrix $H_1$ depend, at least in part, on the transmission characteristics of the medium, such as air, through which a signal is transmitted. A variety of methods may be used at the receiver to determine the channel matrix $H_1$ coefficients, such as transmitting a known pilot signal to a receiver so that the receiver, knowing the pilot signal, can estimate the coefficients of the channel matrix $H_1$ using well-known pilot estimation techniques. Alternatively, when the channel between the transmitter and receiver are reciprocal in both directions, the actual channel matrix $H_1$ is known to the receiver and may also be known to the transmitter.

Communication networks that support AAS do not necessarily provide AAS support in all of the cells of the network. When a subscriber set is operating in a non-AAS cell, it must scan all allocated frequencies to decode channel parameters. If, however, the subscriber set is in an AAS cell, it cannot receive channel parameters and, therefore, must scan all allocated frequencies to decode AAS parameters. Currently, subscribers scan all allocated frequencies to attempt to decode both channel parameters and AAS parameters, even though only one of those sets of parameters is relevant based on the position of the subscriber set. Therefore, the subscriber set unnecessarily consumes significant processing resources. It is apparent, therefore, that there is a need for an improved system and method for scanning allocated frequencies to decode channel parameters and/or AAS parameters in communication networks that support AAS.

Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description of a preferred embodiment is considered in conjunction with the following drawings, in which.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding. Further, where considered appropriate, reference numerals have been repeated among the drawings to represent corresponding or analogous elements.

DETAILED DESCRIPTION

A system and methodology are disclosed for using channel quality indicators for scanning allocated frequencies to decode channel parameters and/or AAS parameters in communication networks that support AAS. Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

Figure 2:
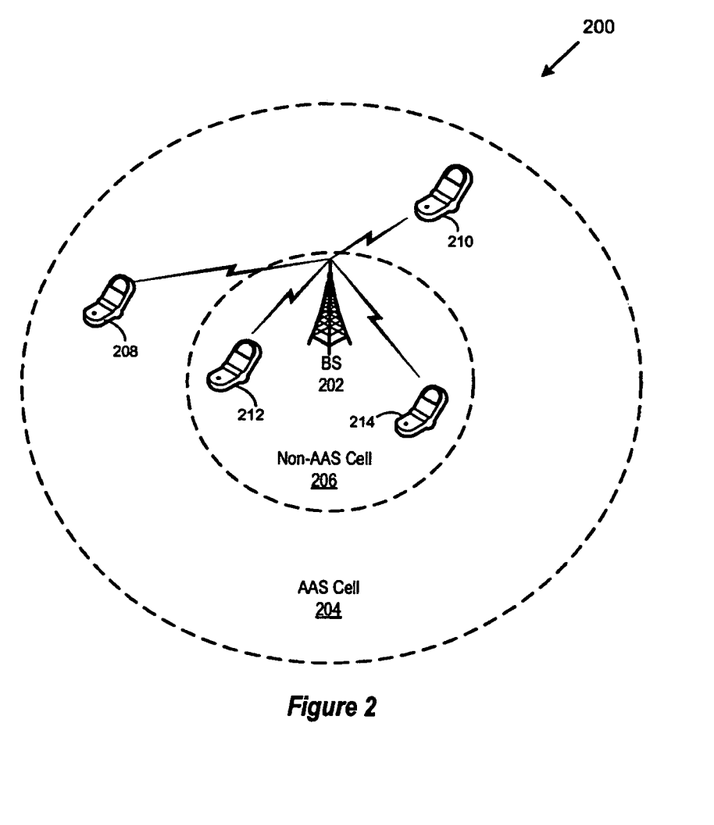
FIG. 2 shows a communication system with a plurality of subscriber sets in non-AAS cells and AAS cells.

FIG. 2 is an illustration of a communication network 200 comprising a base station 202 that is operable to transmit to a plurality of subscribers in AAS cell 204 and non-AAS cell 206. Subscribers 208 and 210 in AAS cell 204 cannot receive channel parameters and, therefore, must scan all allocated frequencies to decode AAS parameters. Subscribers 212 and 214 are in the non-AAS cell 206 and, therefore, are able to receive channel parameters. As discussed above, subscribers currently scan all allocated frequencies to attempt to decode both channel parameters and AAS parameters, thereby consuming significant processing resources. In various embodiments of the present invention, a channel quality indicator, such as carrier to interference-plus-noise ratio (CINR) is used to simplify the parameter search process.

Figure 3:
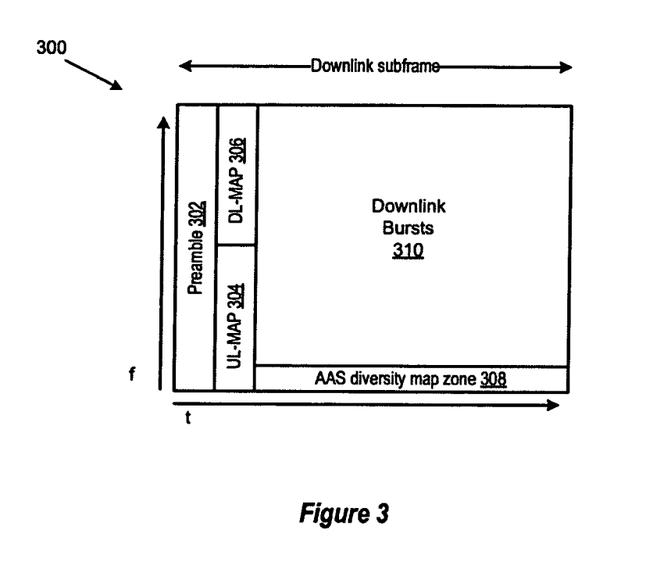
FIG. 3 depicts example downlink subframes used in a communication network that supports adaptive antenna systems.

FIG. 3 is an illustration of a downlink subframe used in a communication system that supports AAS. The subframe 300 shown in FIG. 3 is a simplified version of a downlink subframe described in the IEEE 802.16 standard. A complete description of the downlink subframe used in the aforementioned standard can be found in Section 8.4.4.6 of IEEE 802.16-2005. Downlink subframe 300 comprises a preamble 302, an uplink map 304, a downlink map 306 and one or more diversity map zones 308. The downlink subframe 300 further comprises a plurality of downlink bursts containing payload data. Channel quality indicators, such as CINR, can be derived from the preamble 302, using techniques known in the art. As will be further understood by those of skill in the art, the AAS diversity map zone 308 is the location of the AAS downlink frame prefix (DLFP) which is decoded by the subscriber set during the scanning process. Channel parameters are contained in the uplink map 304 or the downlink map 306. The AAS parameters and channel parameters are downlink subframe parameters that are used to optimize beamforming and other transmission parameters for the transmission of data from the base station 202 to the various subscriber sets. As discussed hereinabove, in current systems a subscriber set decodes both channel parameters and AAS parameters, thereby consuming large amounts of data processing resources. Embodiments of the invention use the channel quality indicator information derived from the preamble 302 to simplify the process of decoding downlink subframe parameters, as discussed in greater detail below.

Figure 4:
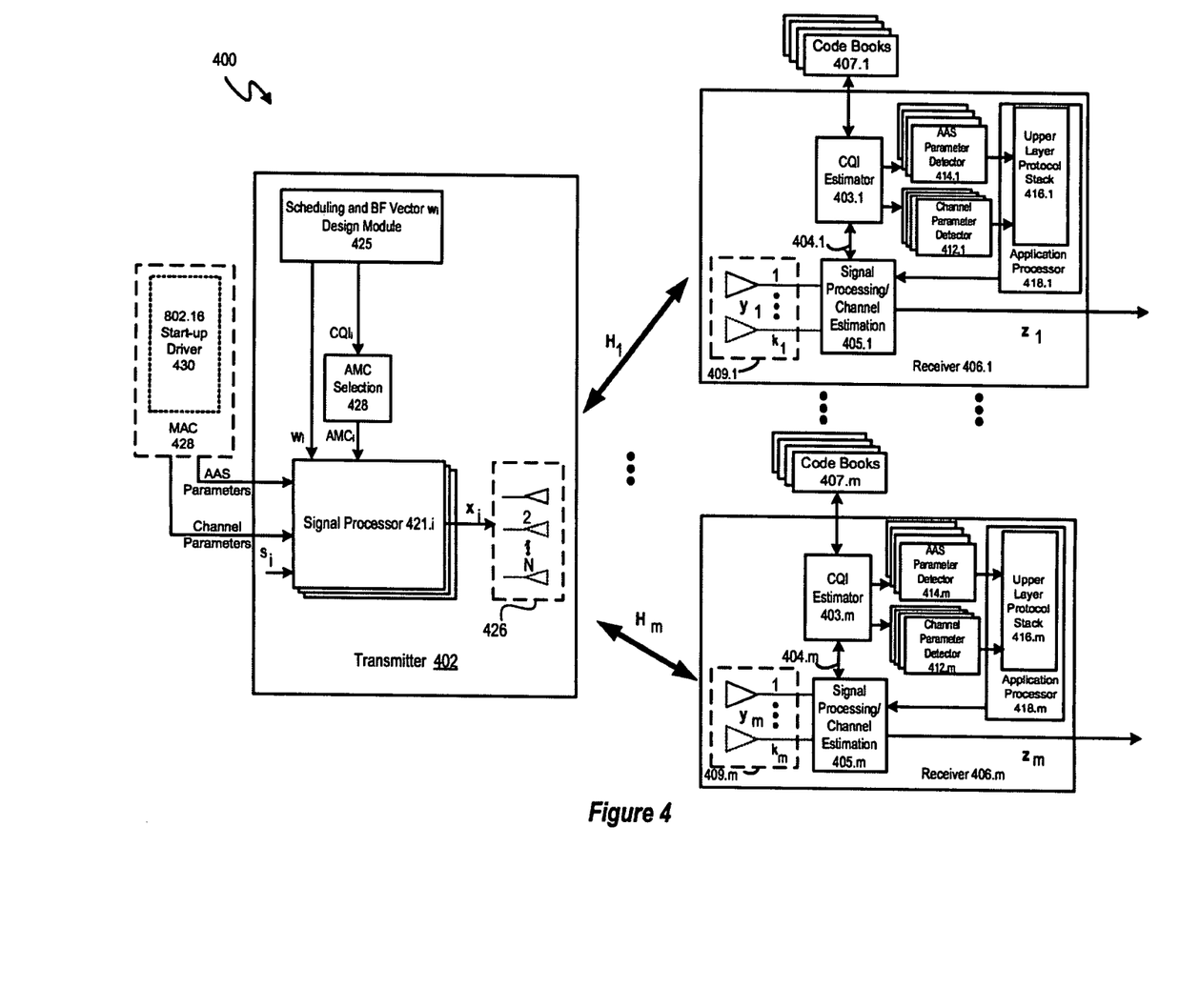
FIG. 4 depicts a wireless communication system in which a plurality of subscriber sets are operable to use channel quality information to scan allocated frequencies for channel parameters and/or AAS parameters.

FIG. 4 depicts a wireless communication system 400 in accordance with embodiments of the invention. As will be understood by those of skill in the art, the functional components shown in FIG. 4 can be implemented in hardware, software or a combination thereof. Input signals are transmitted from a transmitter 402 (e.g., a base station) to one or more receivers 406.1-406.$m$ (e.g., subscriber stations). The transmitter 402 includes a single antenna or an array of antennas 426 for communicating with the receivers 406.1-$m$. The receivers 406.1-$m$, may comprise a single antenna or an array of antennas 409.$i$ for communicating with the transmitter 402. In operation, a data signal $s_i$ presented at the transmitter 402 for transmission to the receiver 406.$i$ is transformed by the signal processor 421.$i$ into a transmission signal represented by the vector $x_i$. The signal processor 421.$i$ performs the transformation using parameters provided by a scheduling and beamforming vector design module 425 and AMC selection module 428. Channel parameters and AAS parameters are generated and provided to the signal processor 421.$i$ by using processing logic in MAC 428 to initiate an 802.16 driver 430. The processor 421.$i$ is operable to embed the channel parameters and AAS parameters in downlink subframes that are transmitted from the transmit antennas 426 to propagate through a matrix channel $H_i$ and are received by the receive antennas 409.$i$ where they are represented by the vector $y_i$. For a channel from the transmitter 402 to the i$^{th}$ receiver 406.$i$, the channel is denoted by $H_i$, i$\in \{1, 2, \ldots, m\}$. The channel matrix $H_i$ may be represented as an $k_i \times N$ matrix of complex entries representing the complex coefficients of the transmission channel between each transmit-receive antenna pair, where N represents the number of antennas of the transmitter 402 and $k_i$ represents the number of antennas of the i$^{th}$ receiver 406.$i$. At the receiver 406.$i$, the signal processing unit 405.$i$ processes the $y_i$ signals received on the k antennas to obtain a data signal, $z_i$, which is an estimate of the transmitted data $s_i$. The processing of the received $y_i$ signals may include combining the $y_i$ signals with appropriate combining vector information retrieved from the codebook 407.$i$.

The channel matrix $H_i$—which specifies the transmission channel between a transmitter and an i$^{th}$ receiver—is estimated in the channel estimation signal processing unit 405.$i$. For example, in a MIMO implementation, each receiver 406.1-$m$ determines its MIMO channel matrix $H_i$ by using pilot estimation or sounding techniques to determine or estimate the coefficients of the channel matrix Each receiver 406.$i$ uses the estimated MIMO channel matrix or other channel-related information (which can be channel coefficients or channel statistics or their functions, such as a precoder, a beamforming vector or a modulation order) to generate CQI information that is to be used to configure/adapt the signals transmitted by the transmitter. In various embodiments of the invention, the CQI information includes, but is not limited to CINR and/or signal-to-noise ratio (SNR) information.

The CQI estimator 403.$i$ generates a quantization/codebook index by accessing the receiver codebook 407.$i$ which stores an indexed set of possible transmission profiles and/or channel matrices $H_i$ along with associated CQI information so that the estimated channel matrix information 404.i generated by the signal processing unit 405.i can be used by the CQI estimator 403.i to retrieve a codebook index from the codebook 407.i. The output of the CQI estimator 403.i is provided to a channel parameter detector 412i and to an AAS parameter detector 414i. As will be discussed in greater detail herein below, embodiments of the present invention reduce the amount of processing required from the signal processing/channel estimator processor 405i by decoding only channel parameters when the subscriber set is in a non-AAS cell and decoding only AAS parameters when the subscriber set is in an AAS cell. The output of the AAS parameter detector 414.i and/or the channel parameter detector 418 is provided to an upper level processing stack for further processing by an application processor 418.i In various embodiments of the invention, the CQI information is used to simplify the decoding process. In the following discussion, CINR information will be used and an example. The CINR level can be used as an indicator of the location of the subscriber unit. As will be understood by those of skill in the art, the CINR is generally higher in an AAS cell. Therefore, if the CINR is above a predetermined level, the subscriber set is located in an AAS cell and the subscriber set will first decode AAS parameters, on the assumption that the subscriber set is in an AAS cell. If, on the other hand, the CINR is below the predetermined level, the subscriber set will decode channel parameter information first, on the assumption that the subscriber set is located in a non-AAS cell.

Figure 5:
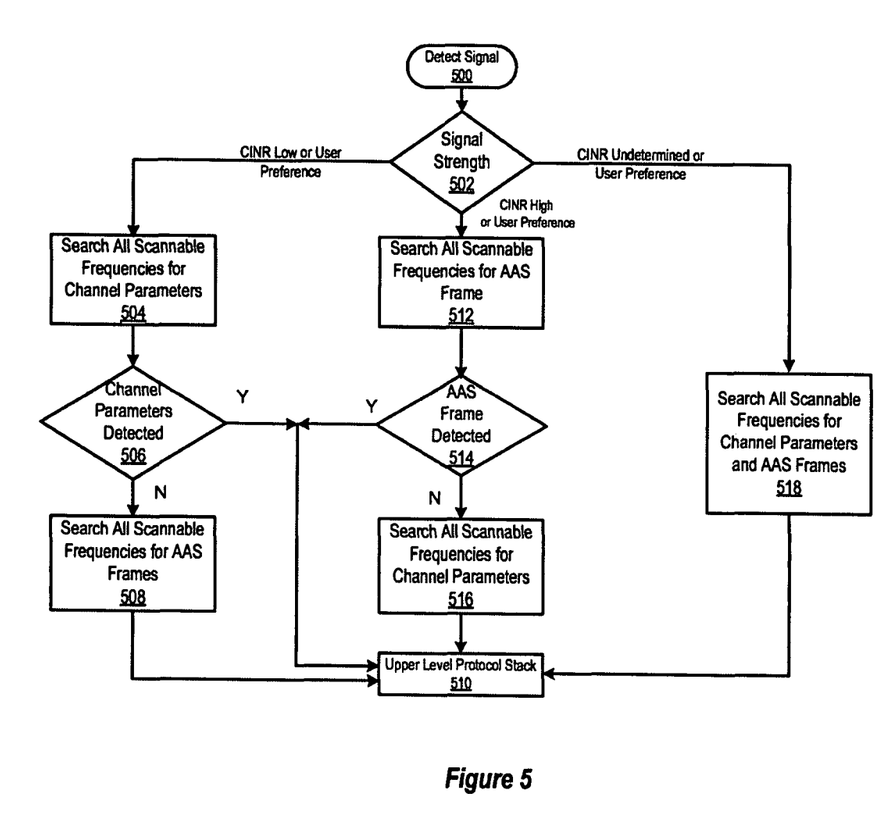
FIG. 5 is an illustration of data processing steps implemented in various embodiments of the invention.

FIG. 5 is an illustration of the processing steps for implementing the various embodiments of the present invention. Processing begins in step 500, where the signal is detected, and proceeds to step 502, where the signal strength is measured by the subscriber station. In step 504, all scannable frequencies are searched for channel parameters. In step 506, a test is conducted to determine whether any channel parameters were detected in step 504. If channel parameters were detected, processing proceeds to step 510. If, however, no channel parameters were detected, processing proceeds to step 508 wherein the subscriber set scans all frequencies for AAS parameters.

If the result of the test conducted in step 502 indicates that CINR is high, processing proceeds to step 512 wherein the subscriber set searches all scannable frequencies for AAS parameters. In step 514, a test is conducted to determine whether AAS parameters were detected. If the result of the test conducted in step 514 indicates that AAS parameters were detected, processing proceeds to step 510. If, however, the result of the test conducted in step 514 indicates that no AAS parameters were detected, processing proceeds to step 516 wherein the subscriber set searches all scannable frequencies for channel parameters. Returning to step 502, if the signal strength measurement indicates that CINR is undetermined, processing proceeds to step 518 wherein the subscriber set searches all scannable frequencies for channel parameters and AAS parameters.

As will be appreciated by those of skill in the art, existing prior solutions require $(t_s+t_r)n$ operations, where:
$t_s$=search time
$t_r$=ranging time
n=number of frequencies
$t_r \gg t_s$.

By contrast, embodiments of the present invention provide a flexible algorithm that requires either $t_s n$ or $t_r n$ operations. Therefore, the present invention provides a savings of $t_s n$ or $t_r n$ over existing techniques.

By now it will be appreciated that embodiments of the present invention provide a novel system and method for processing signals in a communication system. In one aspect, the method comprises: receiving a downlink subframe comprising a preamble, first and second sets of downlink subframe parameters, and a plurality of data bursts within a predetermined frequency band; processing data in the preamble to obtain channel quality indicator (CQI) information; and using the CQI information to select either the first set or the second set of downlink subframe parameters to process the data bursts in the downlink subframe. In some embodiments of this method, the CQI information comprises carrier-to-signal-plus-noise ratio (CINR) information. In other embodiments, the CQI information comprises signal-to-noise (SNR) information. In some embodiments of the invention, the first set of downlink subframe parameters comprises channel parameters and the second set of downlink subframe parameters comprises adaptive antenna system (AAS) parameters. In other embodiments of the invention, the method comprises initially searching all scannable frequencies within a predetermined frequency band for channel parameters if the CQI information is below a predetermined level. In that embodiment, the method further comprises subsequently searching all scannable frequencies in the frequency band for AAS parameters if no channel parameters are detected in the initial search. In another embodiment, the method further comprises initially searching all scannable frequencies within the frequency band for AAS parameters if the CQI information is above a predetermined level. That embodiment further comprises subsequently searching all scannable frequencies in the frequency band for the channel parameters if no channel parameters are detected in the initial search.

In another aspect, embodiments of the invention provide a method for processing data in a communication system, comprising: generating a downlink subframe comprising a preamble and a plurality of data bursts within a predetermined frequency band; embedding first and second sets of downlink subframe parameters in the downlink subframe; transmitting the downlink subframe; receiving the downlink subframe; processing data in the preamble to obtain channel quality indicator (CQI) information; and using the CQI information to select either the first set or second set of downlink subframe parameters to process the data bursts in the downlink subframe. In some embodiments of this system, the CQI information comprises carrier-to-signal-plus-noise ratio (CINR) information. In other embodiments, the CQI information comprises signal-to-noise (SNR) information. In some embodiments of the invention, the first set of downlink subframe parameters comprises channel parameters and the second set of downlink subframe parameters comprises adaptive antenna system (AAS) parameters. In other embodiments of the invention, the method comprises initially searching all scannable frequencies within a predetermined frequency band for channel parameters if the CQI information is below a predetermined level. In that embodiment, the method further comprises subsequently searching all scannable frequencies in the frequency band for AAS parameters if no channel parameters are detected in the initial search. In another embodiment, the method further comprises initially searching all scannable frequencies within the frequency band for AAS parameters if the CQI information is above a predetermined level. That embodiment further comprises subsequently searching all scannable frequencies in the frequency band for the channel parameters if no channel parameters are detected in the initial search.

In yet another aspect, the invention provides a receiver for use in a wireless communication system, comprising: signal processing logic operable to receive a downlink subframe, wherein the subframe comprises a preamble, first and second sets of downlink subframe parameters, and a plurality of data bursts within a predetermined frequency band; processing logic operable to process data in the preamble to obtain channel quality indicator (CQI) information; and processing logic operable to use the CQI information to select either the first set or set second set of downlink subframe parameters to process the data bursts in the downlink subframe. In various embodiments of the invention, the CQI information comprises carrier-to-signal-plus-noise ratio (CINR) information. In other embodiments of the invention, the CQI information comprises signal-to-noise (SNR) information. In some embodiments of the invention, the first set of downlink subframe parameters comprises channel parameters and the second set of downlink subframe parameters comprises adaptive antenna system (AAS) parameters. In that embodiment, the receiver further comprises logic for initially searching all scannable frequencies within the frequency band for the channel parameters if the CQI information is below a predetermined level. In that embodiment, the receiver subsequently searches all scannable frequencies in the frequency band for AAS parameters if no channel parameters are detected in the initial search. In another embodiment, the receiver for initially searches all scannable frequencies within the frequency band for the AAS parameters if the CQI information is above a predetermined level. In that embodiment, the receiver subsequently searches all scannable frequencies in the frequency band for channel parameters if no AAS parameters are detected in the initial search.

The methods and systems for the communication system described herein may be implemented in hardware or in software stored on a computer-readable medium and executed as a computer program on a general purpose or special purpose computer to perform certain tasks. For a hardware implementation, the elements used to perform various signal processing steps at the transmitter and/or at the receiver may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the transmitter and receiver may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein are directed to various communications systems and methods for using same, the present invention is not necessarily limited to the example embodiments illustrate herein. For example, various embodiments of a communication system disclosed herein may be implemented in connection with various proprietary or wireless communication standards.

Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of processing signals in a communication system, comprising:
   receiving a downlink subframe within a predetermined frequency band, wherein the downlink subframe is one of two or more downlink subframes comprised in a downlink frame;
   decoding one or more portions of the downlink subframe;
   determining a relative channel quality responsive to decoding the one or more portions of the downlink subframe;
   when the relative channel quality meets a threshold criterion:
      searching all scannable frequencies within said frequency band for adaptive antenna system (AAS) parameters; and
      subsequently searching all scannable frequencies in said frequency band for channel parameters when no AAS parameters are detected; and
   decoding a data burst in accordance with the AAS parameters or channel parameters.

2. The method of claim 1, further comprising selecting a channel parameters when said relative channel quality does not meet said criterion.

3. The method of claim 1, wherein the one or more portions of the downlink subframe comprise a preamble.

4. The method of claim 3, wherein the relative channel quality is indicated with a channel quality indication (CQI).

5. The method of claim 3, wherein the relative channel quality is indicated with a Carrier to Interference plus Noise Ratio (CINR).

6. The method of claim 3, wherein the relative channel quality is indicated with a Signal to Noise Ratio (SNR).

7. The method of claim 1, wherein the downlink subframe comprises a set of AAS parameters and a set of channel parameters.

8. The method of claim 7, wherein the first set of data comprises a set of adaptive antenna system (AAS) parameters.

9. The method of claim 7, wherein the second set of data comprises a set of channel parameters.

10. The method of claim 1, wherein the downlink subframe comprises only one of the AAS parameters and the channel parameters.

11. A wireless communication device, comprising:
a wireless interface configured to communicate with a serving apparatus;
a processor; and
a computer readable apparatus having a storage medium with at least one computer program stored thereon, the at least one computer program configured to, when executed on the processor:
determine a relative channel quality according to one or more portions of a downlink subframe, wherein the downlink subframe is one of two or more downlink subframes comprised in a downlink frame;
when the relative channel quality meets a threshold criterion:
searching all scannable frequencies within said frequency band for AAS (adaptive antenna system) parameters; and
subsequently searching all scannable frequencies in said frequency band for channel parameters when no AAS parameters are detected; and
decode a data burst in accordance with the AAS parameters or channel parameters.

12. The wireless communication device of claim 11, wherein the computer program is additionally configured to, when executed by the processor, receive the downlink subframe.

13. The wireless communication device of claim 12, wherein the downlink subframe comprises at least a preamble.

14. The wireless communication device of claim 13, wherein the relative channel quality is determined by decoding the preamble.

15. The wireless communication device of claim 13, wherein the downlink subframe comprises the AAS and channel parameters.

16. The wireless communication device of claim 15, wherein the AAS parameters comprises a set of AAS parameters.

17. The wireless communication device of claim 15, wherein the channel parameters comprises a set of channel parameters.

* * * * *